Design For A Time Keeper Case

4207

REISSUED DEC 20 1870

Witness
E. M. Bliss
Jeremy W. Bliss

Inventor
Elias Ingraham

United States Patent Office.

ELIAS INGRAHAM, OF BRISTOL, CONNECTICUT.

Letters Patent No. 3,850, dated February 15, 1870; reissue No. 4,207, dated December 20, 1870.

DESIGN FOR A CLOCK-CASE.

The Schedule referred to in these Letters Patent and making part of the same.

I, ELIAS INGRAHAM, of Bristol, in the county of Hartford and State of Connecticut, have invented or produced a new and original Design for a Clock-Case, of which the following is a specification.

My invention or design consists of a clock-case having its edge formed into corrugations by alternate transverse elevations and depressions, as herein described.

In the accompanying drawing—

Figure 1:
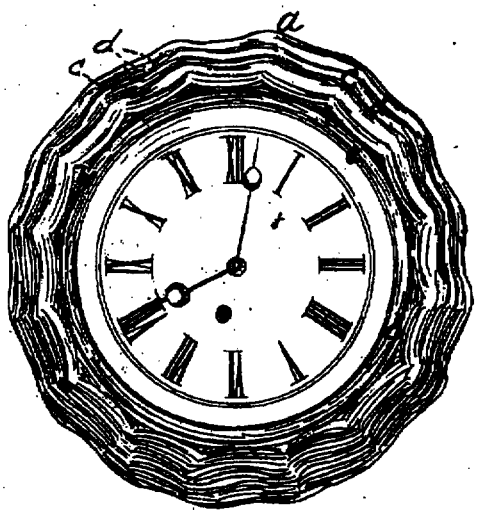
Figure 1 is a front elevation of a clock-case of my design.
Figure 2:
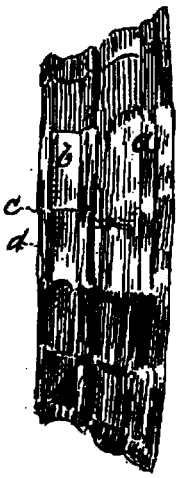
Figure 2 is an edge view of the same.

*a* is the body of the case, and

*b* is the sash or door.

The edge of this case is formed into corrugations running from front to rear by means of the transverse alternate elevations *c* and depressions *d*.

I claim as my invention—

The ornamentation of a clock-case by forming its edge into corrugations or transverse elevations and depressions *c d*, substantially as shown and described.

Witnesses: ELIAS INGRAHAM.

CHAS. T. FOOTE,

AUGUSTINE NORTON.